H. WALKER.
ADJUSTABLE AUTOMOBILE LUGGAGE RACK.
APPLICATION FILED OCT. 27, 1915.
1,193,444.
Patented Aug. 1, 1916.
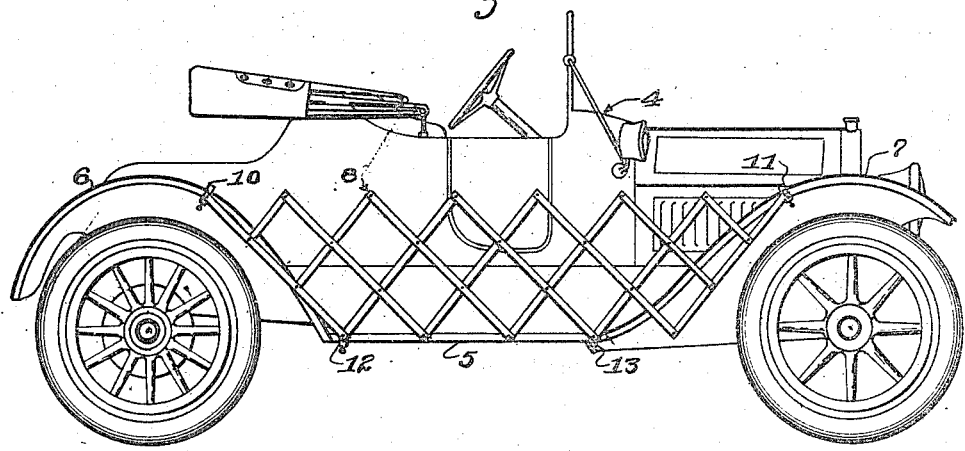
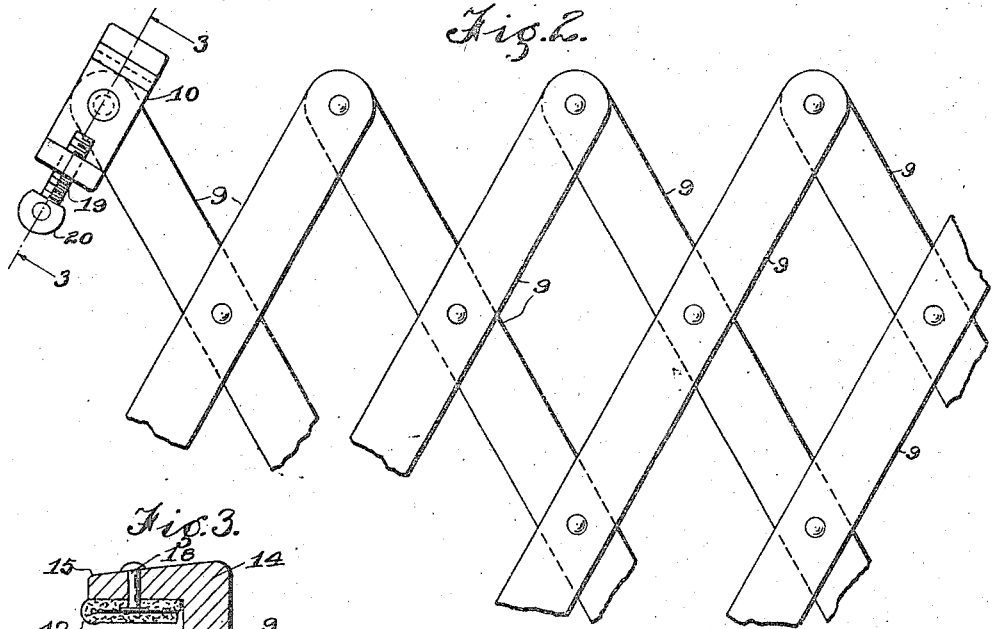
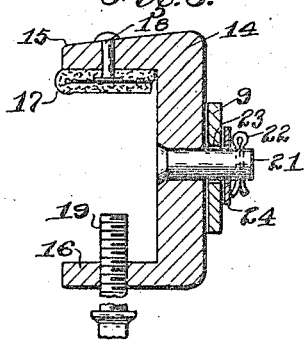
Inventor
Harry Walker
By Edmund R. Mason
Att'y.

UNITED STATES PATENT OFFICE.

HARRY WALKER, OF ANAHEIM, CALIFORNIA, ASSIGNOR OF ONE-HALF TO GEORGE BISHOP, OF ANAHEIM, CALIFORNIA.

ADJUSTABLE AUTOMOBILE LUGGAGE-RACK.

1,193,444.  Specification of Letters Patent.  Patented Aug. 1, 1916.

Application filed October 27, 1915. Serial No. 58,200.

*To all whom it may concern:*

Be it known that I, HARRY WALKER, a citizen of the United States, residing at Anaheim, in the county of Orange and State of California, have invented new and useful Improvements in Adjustable Automobile Luggage-Racks, of which the following is a specification.

This invention relates to an adjustable automobile luggage rack, and pertains especially to a rack which may be attached to the foot board and fenders of an automobile.

It is an object of this invention to provide an adjustable rack which is adapted to be secured to any size of automobiles.

It is another object of this invention to provide a rack which is collapsible and may be folded into a very small compact space.

It is a further object of this invention to provide a rack which may be easily detached from the automobile body.

I accomplish these objects by means of the structure illustrated in the accompanying drawing, in which:

Figure 1 is a side view of an automobile with my improved luggage rack attached thereto. Fig. 2 is a fragmentary enlarged side elevation of the rack. Fig. 3 is an enlarged section as seen on the line 3—3 of Fig. 2.

I have herein shown my improved rack attached to the body of a roadster 4 of a well known type, which is provided with a foot board 5 and wheel fenders 6 and 7.

The rack is indicated generally by 8 and comprises a plurality of metal bars 9 pivotally secured to each other to form what is commonly known as lazy tongs. Pivotally secured to the upper end of one of the bars is a clamp 10 adapted to secure the rack to the fender. Similarly situated at the opposite end of the rack is a clamp 11. Secured to the lower end of the bars are clamps 12 and 13. I have herein shown two clamps secured to the lower end, but the number may be varied depending upon the length of the footboard 5. Each clamp is comprised of a body member 14 of substantially channel form having legs 15 and 16 between which is disposed the footboard or fender. The upper leg 15 has secured thereto a pad member 17 which may be of rubber, or similar material, and is securely fastened to the leg 15 by means of a rivet 18 or any other suitable fastening means. Oppositely disposed to the pad 17 is a screw 19 which is threaded within an aperture in the leg 16 and is provided with a convenient head 20 for operation of the same.

At the center of the body 14 is an aperture through which is passed a pivot pin 21 having at the end thereof a cotter pin 22 designed to hold the clamp to a bar 9. The latter is provided with an aperture 23, whereby a free pivotal movement may be secured between the bar 9 and the clamp. A washer 24 is interposed between the cotter pin 22 and the bar 9.

To attach the rack to an automobile the lazy tongs are opened so that they fully cover the space between fenders. Clamps 12 and 13 are secured to the foot board 5 and clamps 10 and 11 to the rear and front fenders.

It is obvious that by reason of the lazy tongs construction and the pivoted clamps that the rack may be adjusted to any automobile.

The rack 8 in connection with the foot board, fenders and adjacent side of the body forms a receptacle in which luggage of various sorts can be conveniently carried. When not in use the rack may be removed, thereby freeing the foot board and fenders of any attachments.

What I claim is:

1. A luggage carrier, comprising the combination with an automobile body provided with front and rear fenders and a foot board, of a longitudinally adjustable rack, clamps secured to said rack for detachably securing the latter to said foot board and other clamps secured to said rack for detachably securing the latter to said fenders.

2. A luggage carrier, comprising the combination with an automobile body, of a rack comprised of lazy tongs, clamps secured to the lower end of said rack, detachably securing the latter to the foot board of said automobile body, and clamps secured to the ends of said rack for detachably securing the latter to the fenders of said automobile.

In witness that I claim the foregoing I have hereunto subscribed my name this 19th day of October, 1915.

HARRY WALKER.